(12) United States Patent
Mitra et al.

(10) Patent No.: US 11,604,876 B2
(45) Date of Patent: *Mar. 14, 2023

(54) MALWARE PROTECTION FOR VIRTUAL MACHINES

(71) Applicant: Rubrik, Inc., Palo Alto, CA (US)

(72) Inventors: Abhay Mitra, Santa Clara, CA (US); Vijay Karthik, Santa Clara, CA (US); Vivek Sanjay Jain, Palo Alto, CA (US); Avishek Ganguli, San Mateo, CA (US); Arohi Kumar, Palo Alto, CA (US); Kushaagra Goyal, Mountain View, CA (US); Christopher Wong, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 250 days.

This patent is subject to a terminal disclaimer.

(21) Appl. No.: 16/774,661

(22) Filed: Jan. 28, 2020

(65) Prior Publication Data

US 2021/0232683 A1    Jul. 29, 2021

(51) Int. Cl.
*G06F 21/56* (2013.01)
*H04L 9/06* (2006.01)
*G06F 21/85* (2013.01)
*G06F 9/455* (2018.01)
*G06F 11/14* (2006.01)

(52) U.S. Cl.
CPC ........ *G06F 21/564* (2013.01); *G06F 9/45558* (2013.01); *G06F 11/1469* (2013.01); *G06F 21/85* (2013.01); *H04L 9/0643* (2013.01); *G06F 2009/45575* (2013.01); *G06F 2009/45587* (2013.01)

(58) Field of Classification Search
None
See application file for complete search history.

(56) References Cited

U.S. PATENT DOCUMENTS

| | | |
|---|---|---|
| 8,307,443 B2 | 11/2012 | Wang et al. |
| 8,997,230 B1 | 3/2015 | McCauley et al. |
| 9,485,272 B1 | 11/2016 | Roundy |
| 9,740,577 B1 | 8/2017 | Chakraborty et al. |
| 10,229,269 B1 | 3/2019 | Patton et al. |
| 10,536,471 B1 | 1/2020 | Derbeko et al. |
| 2006/0136720 A1* | 6/2006 | Armstrong ............ G06F 21/566 713/164 |
| 2006/0236393 A1 | 10/2006 | Kramer et al. |
| 2008/0168562 A1 | 7/2008 | Haga et al. |
| 2009/0007100 A1 | 1/2009 | Field et al. |
| 2009/0038011 A1 | 2/2009 | Nadathur |
| 2009/0089879 A1 | 4/2009 | Wang et al. |
| 2012/0254416 A1 | 10/2012 | Fake et al. |

(Continued)

*Primary Examiner* — William J. Goodchild
(74) *Attorney, Agent, or Firm* — Holland & Hart LLP

(57) ABSTRACT

A computer-implemented method at a data management system comprises: receiving, at a storage appliance from a server hosting a virtual machine, a write made to the virtual machine; computing, at the storage appliance, a fingerprint of the transmitted write; comparing, at the storage appliance, the computed fingerprint to malware fingerprints in a malware catalog; repeating the computing and comparing; and disabling the virtual machine if a number of matches from the comparing breaches a predetermined threshold over a predetermined amount of time.

18 Claims, 9 Drawing Sheets

(56) References Cited

U.S. PATENT DOCUMENTS

| | | | |
|---|---|---|---|
| 2015/0019509 A1* | 1/2015 | Aronovich | G06F 3/067 707/692 |
| 2016/0048683 A1* | 2/2016 | Sanders | H04L 63/145 726/23 |
| 2021/0232682 A1 | 7/2021 | Mitra et al. | |
| 2021/0234872 A1 | 7/2021 | Mitra et al. | |

* cited by examiner

MALWARE PROTECTION FOR VIRTUAL MACHINES

TECHNICAL FIELD

The present disclosure generally relates to virtual machines and more particularly, but not exclusively, to malware protection for virtual machines.

BACKGROUND

Malware, or malicious software, is software intentionally designed to cause damage to a computing device or act against the interest of the user of the computing device. Malware can include spyware, ransomware, viruses, etc. A virtual machine, which is an emulation of a computing device, can also be subject to malware.

BRIEF DESCRIPTION OF THE DRAWINGS

To more easily identify the discussion of any particular element or act, the most significant digit or digits in a reference number refer to the figure ("FIG.") number in which that element or act is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Embodiments provide real-time protection against malware for virtual machines. In an embodiment, a filter driver is installed in virtualized infrastructure managers. The filter driver streams writes done in the virtual machine in real time to a cluster. The cluster can monitor these writes and look for malicious software being downloaded in all the VMs being protected.

Figure 1A:
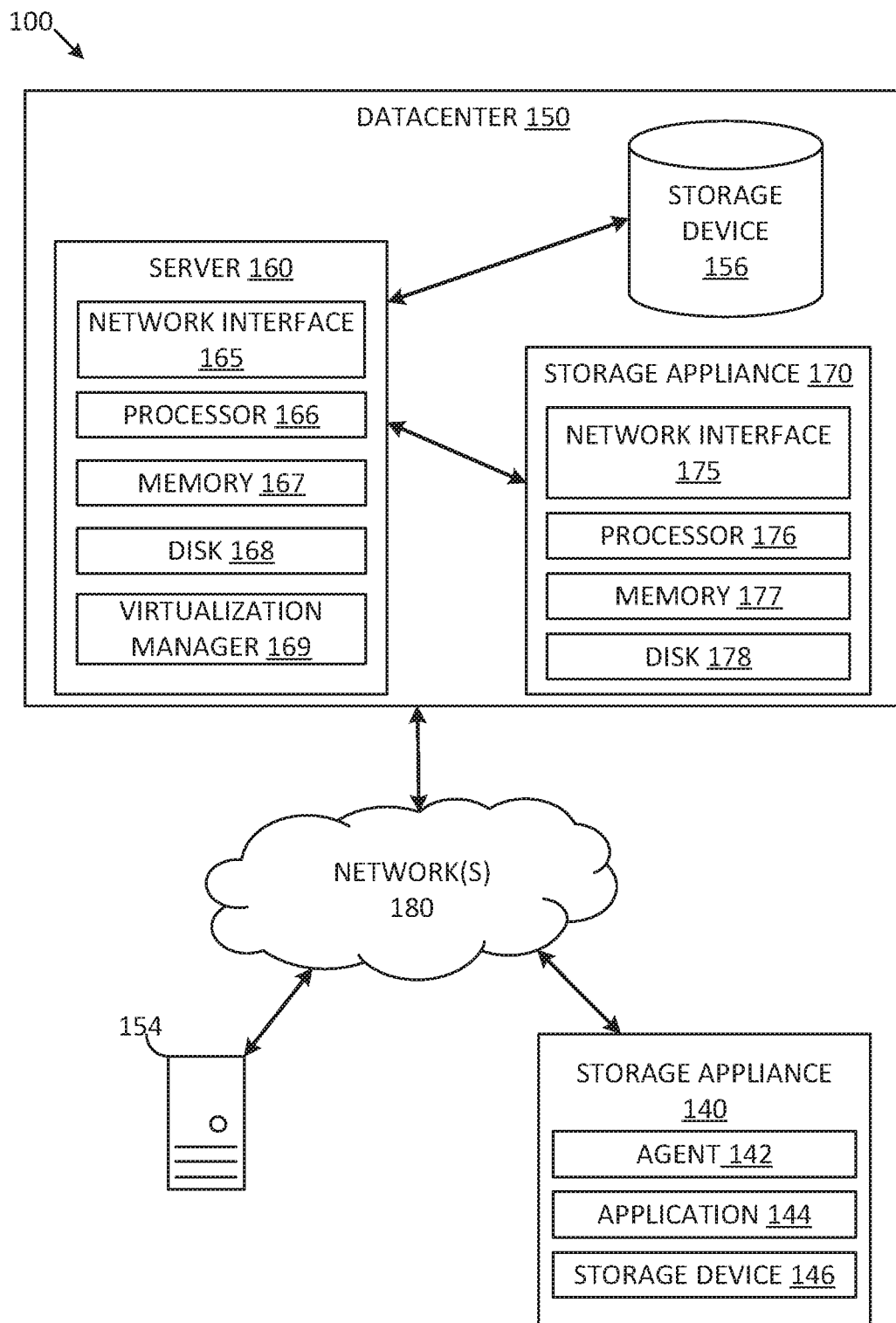
FIG. 1A depicts a networked computing environment in which the disclosed technology may be practiced, according to some example embodiments.

FIG. 1A depicts one embodiment of a networked computing environment 100 in which the disclosed technology may be practiced. As depicted, the networked computing environment 100 includes a datacenter 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment 100 may include other computing devices and/or other storage devices not shown. The other computing devices may include, for example, a mobile computing device, a non-mobile computing device, a server, a work station, a laptop computer, a tablet computer, a desktop computer, or an information processing system. The other storage devices may include, for example, a storage area network storage device, a networked-attached storage device, a hard disk drive, a solid-state drive, or a data storage system.

The datacenter 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the datacenter 150 to each other. The storage appliance 170 may include a data management system for backing up virtual machines and/or files within a virtualized infrastructure. The server 160 may be used to create and manage one or more virtual machines associated with a virtualized infrastructure.

The one or more virtual machines may run various applications, such as a database application or a web server (e.g., a web server hosting an auto-parts website). The storage device 156 may include one or more hardware storage devices for storing data, such as a hard disk drive (HDD), a magnetic tape drive, a solid-state drive (SSD), a storage area network (SAN) storage device, or a networked attached storage (NAS) device. In some cases, a datacenter, such as datacenter 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 180 may include a secure network such as an enterprise private network, an unsecure network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

A server, such as server 160, may allow a client to download information or files (e.g., executable, text, application, audio, image, or video files) from the server 160 or to perform a search query related to particular information stored on the server 160. In some cases, a server may act as an application server or a file server. In general, a server may refer to a hardware device that acts as the host in a client-server relationship or a software process that shares a resource with or performs work for one or more clients.

One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer-readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. The virtualization manager 169 may manage the provisioning of virtual machines running within the virtualized infrastructure and provide an interface to computing devices interacting with the virtualized infrastructure. In one example, the virtualization manager 169 may set a virtual machine into a frozen state in response to a snapshot request made via an application programming interface (API) by a storage appliance (e.g., agent installed on the storage appliance), such as storage appliance 140 or storage appliance 170. Setting the virtual machine into a frozen state may allow a point-in-time snapshot of the virtual machine to be stored or transferred. In one example, updates made to a virtual machine that has been set into a frozen state may be written to a separate file (e.g., an update file) while the virtual machine may be set into a read-only state to prevent modifications to the virtual disk file while the virtual machine is in the frozen state.

The virtualization manager 169 may then transfer data associated with the virtual machine (e.g., an image of the virtual machine or a portion of the image of the virtual disk file associated with the state of the virtual disk at a point in time is frozen) to a storage appliance in response to a request made by the storage appliance 170. After the data associated with the point-in-time snapshot of the virtual machine has been transferred to the storage appliance 170, the virtual machine may be released from the frozen state (i.e., unfrozen) and the updates made to the virtual machine and stored in the separate file may be merged into the virtual disk file. The virtualization manager 169 may perform various virtual machine-related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer-readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point-in-time versions of thousands of virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 154.

The storage appliance 140 may comprise a cloud-based data management system for backing up virtual machines and/or files within a virtualized infrastructure, such as virtual machines running on server 160 or files stored on server 160 (e.g., locally stored files, files stored in mounted directories), according to some example embodiments.

In some cases, networked computing environment 100 may provide remote access to secure applications and files stored within datacenter 150 from a remote computing device, such as computing device 154. The datacenter 150 may use an access control application to manage remote access to protected resources, such as protected applications, databases, or files located within the datacenter 150. To facilitate remote access to secure applications and files, a secure network connection may be established using a virtual private network (VPN). A VPN connection may allow a remote computing device, such as computing device 154, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 170 may manage the extraction and storage of virtual machine snapshots associated with different point-in-time versions of one or more virtual machines running within the datacenter 150. A snapshot of a virtual machine may correspond with a state of the virtual machine at a particular point in time. In response to a restore command from the server 160, the storage appliance 170 may restore a point-in-time version of a virtual machine or restore point-in-time versions of one or more files located on the virtual machine and transmit the restored data to the server 160. In response to a mount command from the server 160, the storage appliance 170 may allow a point-in-time version of a virtual machine to be mounted and allow the server 160 to read and/or modify data associated with the point-in-time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point-in-time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots./VM5Nersion23). In one example, the storage appliance 170 may run an NFS server and make the particular version (or a copy of the particular version) of the virtual machine accessible for reading and/or writing. A user (e.g., database administrator) of the storage appliance 170 may then select the particular version to be mounted and run an application (e.g., a data analytics application) using the mounted version of the virtual machine. In another example, the particular version may be mounted as an iSCSI target.

In some example embodiments, the storage appliance 140 is an external network connected database appliance comprising an agent 142, an application 144, and a storage device 146. In some example embodiments, the application 144 is a database application for managing a database (e.g., Oracle database management system) that can store database data locally on the storage device 146, or on remote storage locations, such as within the datacenter 150. The agent 142 is a remote connection system for performing snapshots of database data (e.g., application 144), and can further implement bootstrapping, upgrade, and further include backup features to transfer data from the storage appliance 140 to datacenter 150 via networks 180.

In some example embodiments, the agent 142 can be uploaded from the datacenter 150 and installed on the storage appliance 140. After installation on storage appliance 140, the agent 142 can be enabled or disabled by the storage appliance 140 over time. The agent 142 may acquire one or more electronic files or snapshot information associated with the one or more electronic files from the application 144. The snapshot information may include full and/or differential snapshot data. In one example, the one or more electronic files may comprise a database file for a database and the snapshot information may comprise a differential backup of the database file.

In those embodiments in which the application 144 is a database application that manages a database, the agent 142 is configured to acquire one or more electronic files corresponding with a first point-in-time version of the database from the database application. The agent 142 can further acquire a database file for the database from the application 144 or acquire a full or differential backup of the database from the computing application 144. The determination of whether the agent 142 acquires the database file or the full or differential backup may depend on a file size of the database file. The database file may comprise a text file or a binary file. The agent 142 may transfer one or more changed data blocks corresponding with the first point-in-time version of the database to the storage appliance 140. The one or more changed data blocks may be identified by the agent 142 by generating and comparing fingerprints or signatures for data blocks of the database file with previously generated fingerprints or signatures associated with earlier point-in-time versions of the database file captured prior to the first point in time. In some example embodiments, the agent 142 can perform automatic upgrades or downgrades the backup agent 142 to be in-sync with software changes to a plurality of nodes (e.g., nodes operating within storage appliance 170).

In some example embodiments, the agent 142 is further configured to interface with application 144 or storage device 146 to implement changes, such as creating directories, database instances, reads/writes, and other operations to provide database management functions between the storage appliance 140 and devices within datacenter 150. For example, the application 144 can be a relational database management application with plugin functionality, in which third-party developed plugins or extensions can be integrated in the application 144 to perform actions, such as creation of a database instance.

Figure 1B:
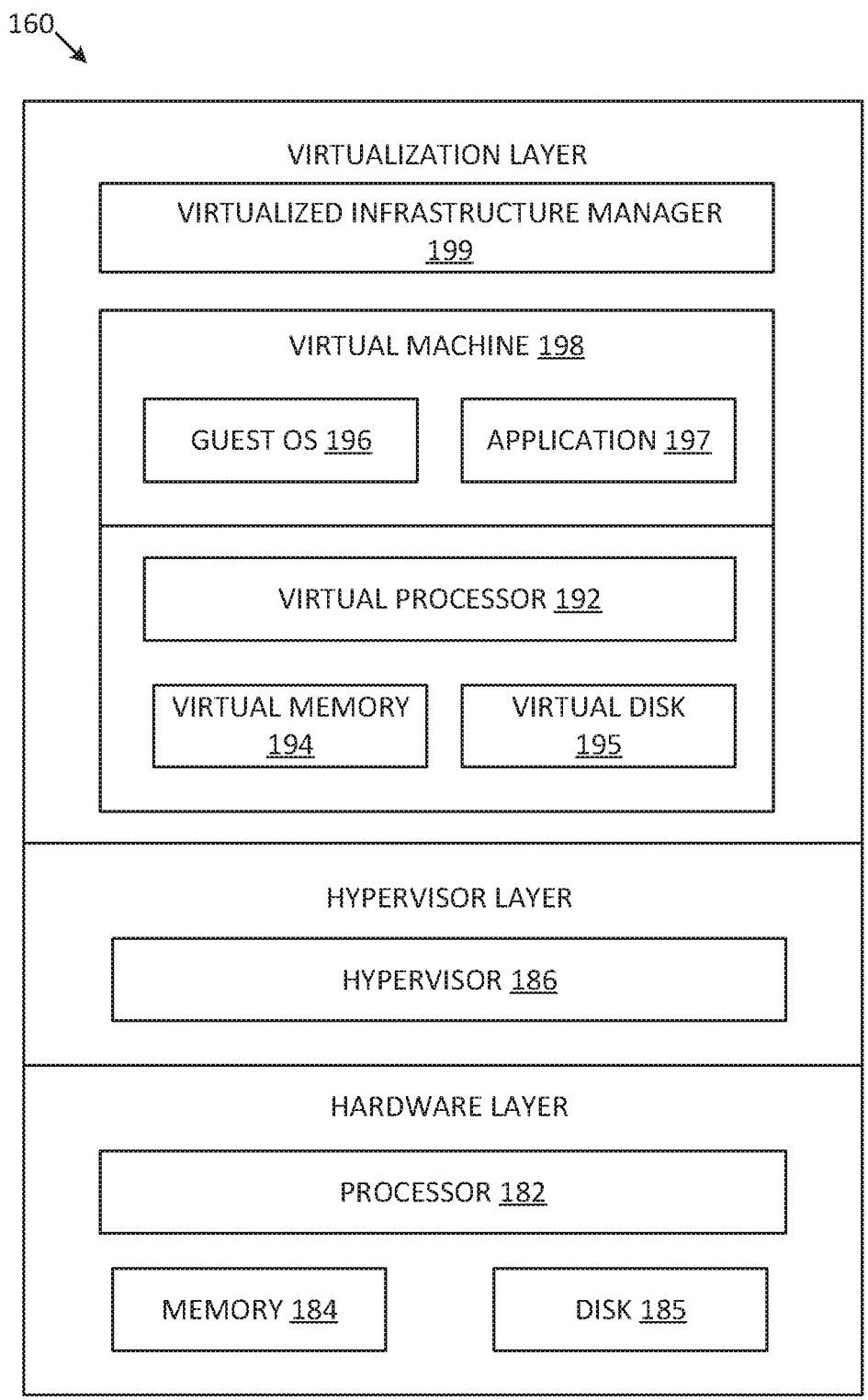
FIG. 1B depicts a server of a networked computing environment, according to some example embodiments.

FIG. 1B depicts one embodiment of server 160 in FIG. 1A. The server 160 may comprise one server out of a plurality of servers that are networked together within a datacenter 150. In one example, the plurality of servers may be positioned within one or more server racks within the datacenter 150. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197.

The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines. The virtualized infrastructure manager 199 may manage the provisioning of virtual machines running within the virtualized infrastructure and provide an interface to computing devices interacting with the virtualized infrastructure. The virtualized infrastructure manager 199 may perform various virtualized infrastructure-related tasks, such as cloning virtual machines, creating new virtual machines (e.g., new virtual machines for new nodes of the cluster), monitoring the state of virtual machines, and facilitating backups of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 199 may output one or more virtual data blocks associated with the virtual machine that have been modified between the first point in time and the second point in time.

In some embodiments, the server 160 or the hypervisor 186 may communicate with a storage appliance, such as storage appliance 140 in FIG. 1A or storage appliance 170 in FIG. 1A, using a distributed file system protocol such as Network File System (NFS) Version 3. The distributed file system protocol may allow the server 160 or the hypervisor 186 to access, read, write, or modify files stored on the storage appliance as if the files were locally stored on the server 160. The distributed file system protocol may allow the server 160 or the hypervisor 186 to mount a directory or a portion of a file system located within the storage appliance 140. For example, the storage appliance 140 can include a standalone host of a database, where the server 160 mounts the database directories as if the files were locally stored on server 160. Further, the server 160 may function as a backup device for storage appliance 140 by backing up data in the mounted directories in a distributed database within the datacenter 150, such as a cluster of nodes in the storage appliance 170.

Figure 1C:
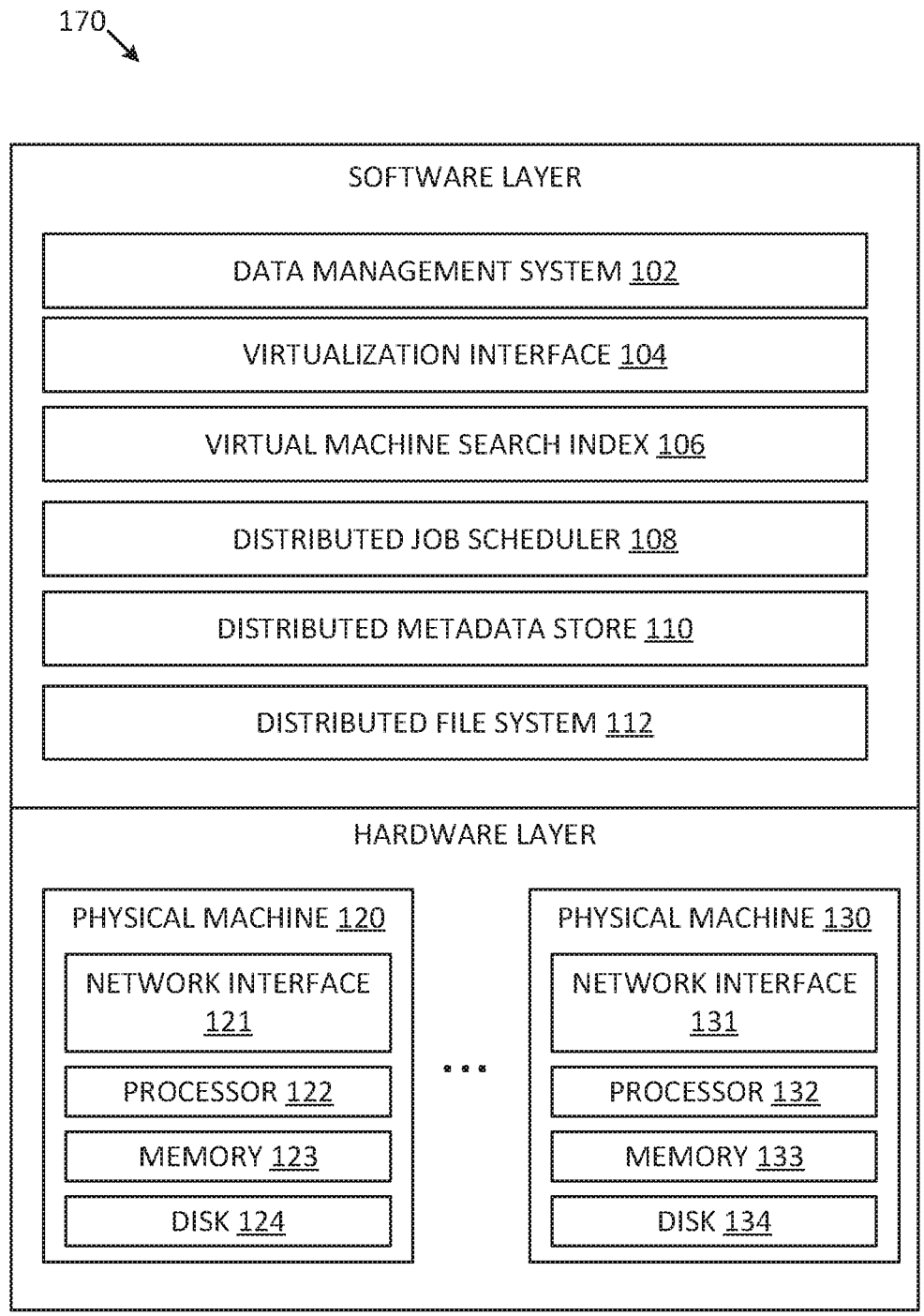
FIG. 1C depicts a storage appliance of a networked computing environment, according to some example embodiments.

FIG. 1C depicts one embodiment of the storage appliance 170 in FIG. 1A. The storage appliance 170 may include a plurality of physical machines that may be grouped together and presented as a single computing system. Each physical machine of the plurality of physical machines may comprise a node in a cluster (e.g., a failover cluster, a Cassandra cluster). In one example, the storage appliance 170 may be positioned within a server rack within a datacenter. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer-readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer-readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., four machines in a cluster). Each of the plurality of physical machines may include a plurality of multi-core CPUs, 128 GB of RAM, a 500 GB SSD, four 4 TB HDDs, and a network interface controller.

In some embodiments, the plurality of physical machines may be used to implement a cluster-based network file-server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 160 in FIG. 1A, or a hypervisor, such as hypervisor 186 in FIG. 1B, to communicate with the storage appliance 170 may not provide a failover mechanism (e.g., NFS Version 3). In the case that no failover mechanism is provided on the client side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 186 in FIG. 1B, may be configured with a first floating IP address associated with a first node in the cluster. The hypervisor 186 may connect to the cluster using the first floating IP address. In one example, the hypervisor 186 may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor 186 for communicating with the cluster.

In order to determine which of the other nodes in the cluster will assume the first floating IP address, a VRRP priority may be established. In one example, given a number (N) of nodes in a cluster from node (0) to node (N−1), for a floating IP address (i), the VRRP priority of nodeG) may be G-i) modulo N. In another example, given a number (N) of nodes in a cluster from node (0) to node (N−1), for a floating IP address (i), the VRRP priority of nodeG) may be (i-j) modulo N. In these cases, nodeG) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snap-50 shots/). A directory for each virtual machine protected using the storage appliance 170 may be created (e.g., the directory for Virtual Machine A may be/snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/and a second snapshot of Virtual Machine A may reside in /snapshots/VM_A/s2/).

The distributed file system 112 may present itself as a single file system, in which, as new physical machines or nodes are added to the storage appliance 170, the cluster may automatically discover the additional nodes and automatically increase the available capacity of the file system 112 for storing files and other data. Each file stored in the distributed file system 112 may be partitioned into one or more chunks or shards. Each of the one or more chunks may be stored within the distributed file system 112 as a separate file. The files stored within the distributed file system 112 may be replicated or mirrored over a plurality of physical machines, thereby creating a load-balanced and fault-tolerant distributed file system 112. In one example, storage appliance 170 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 110 may include a distributed database management system that provides high availability without a single point of failure. In one embodiment, the distributed metadata store 110 may comprise a database, such as a distributed document-oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals.

The distributed job scheduler 108 may be used for scheduling backup jobs that acquire and store virtual machine snapshots for one or more virtual machines over time. The distributed job scheduler 108 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 108 may schedule a specific job to be run on a particular node based on data stored on the particular node. For example, the distributed job scheduler 108 may schedule a virtual machine snapshot job to be run on a node in a cluster that is used to store snapshots of the virtual machine in order to reduce network congestion.

The distributed job scheduler 108 may comprise a distributed fault-tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster. In one example, the distributed job scheduler 108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 108 may ensure that each task of the series of tasks is executed based on the ordering of tasks. Tasks that do not have dependencies with each other may be executed in parallel.

In some cases, the distributed job scheduler 108 may schedule each task of a series of tasks to be performed on a specific node in a cluster. In other cases, the distributed job scheduler 108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 108 may assign one or more tasks associated with a job to be executed on a particular node in a cluster based on the location of data required to be accessed by the one or more tasks.

In one embodiment, the distributed job scheduler 108 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 199 in FIG. 1B, to create a frozen copy of the virtual machine and to transfer one or more chunks (or one or more files) associated with the frozen copy to a storage appliance, such as storage appliance 170 in FIG. 1A. The one or more tasks may also include generating metadata for the one or more chunks, storing the metadata using the distributed metadata store 110, storing the one or more chunks within the distributed file system 112, and communicating with the virtualized infrastructure manager 199 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 112 (e.g., the first chunk is located at/snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption-related tasks.

The virtualization interface 104 may provide an interface for communicating with a virtualized infrastructure manager managing a virtualization infrastructure, such as virtualized infrastructure manager 199 in FIG. 1B, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine). In this case, storage appliance 170 may request and receive data from a virtualized infrastructure without requiring agent software to be installed or running on virtual machines within the virtualized infrastructure. The virtualization interface 104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 106 may include a list of files that have been stored using a virtual machine and a version history for each of the files in the list. Each version of a file may be mapped to the earliest point-in-time snapshot of the virtual machine that includes the version of the file or to a snapshot of the virtual machine that includes the version of the file (e.g., the latest point-in-time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

In one embodiment, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 112 in FIG. 1C.

The data management system 102 may comprise an application running on the storage appliance (e.g., storage appliance 170) that manages and stores one or more snapshots of a virtual machine. In one example, the data management system 102 may comprise a highest-level layer in an integrated software stack running on the storage appliance. The integrated software stack may include the data management system 102, the virtualization interface 104, the distributed job scheduler 108, the distributed metadata store 110, and the distributed file system 112.

In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point-in-time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

Figure 2:
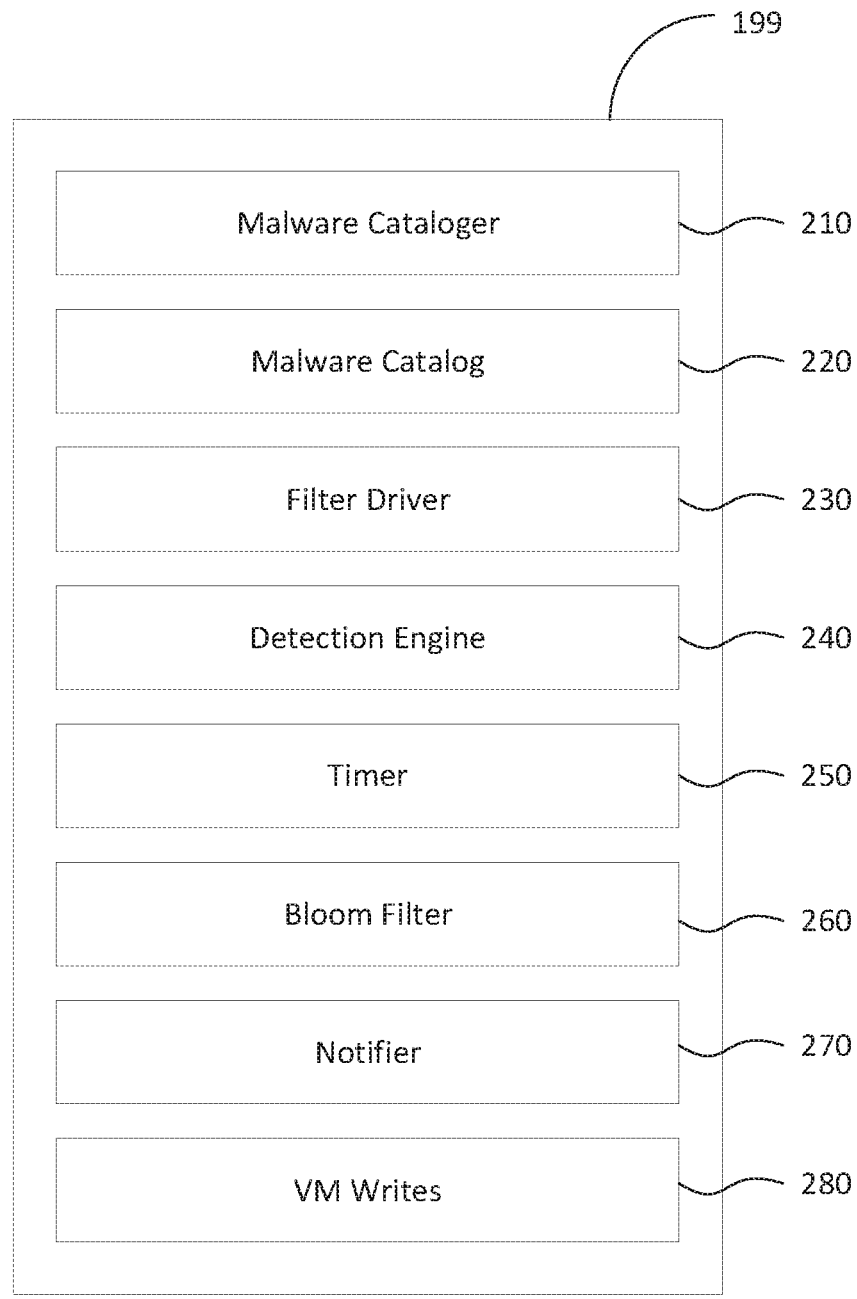
FIG. 2 shows an example virtualized infrastructure manager.

FIG. 2 shows an example virtualized infrastructure manager 199. In an embodiment, the manager 199 comprises a filter driver 230 and remaining components reside on a different device, e.g., the storage device 156 and/or the storage appliance 140, in which case, the filter driver 230 transmits writes from the virtual machine to the other components. The other components include a malware cataloger 210, a malware catalog 220, a detection engine 240, a timer 250, an optional bloom filter 260, a notifier 270 and virtual machine (VM) writes 280 that the filter driver 230 transmits to the other components residing locally or at a different device. In an embodiment, the filter driver 230 and the other components can reside on separate devices. For example, the filter driver may reside on a server hosting the virtual machine and the remaining components can be located on a separate device or a same device, but not part of the actual virtual machine. In that way, writes to the VM and the transmission of writes can be done asynchronously without effecting IO bursts to the VM. Further, the VM itself cannot be compromised by malware (e.g., malware detection software disabled) as the malware detection is done outside of the VM.

The malware cataloger 210 generates a catalog from a set of known malware to store in the malware catalog 220. Four kilobyte aligned offsets (binary and/or compressed binary) are fingerprinted. In an example, fingerprinting can be done using a fingerprinting algorithm such as SHA (e.g., SHA256) and MD5 to efficiently find similarity with malware binaries or other type of algorithm. Alternatively, other sized offsets may be used.

The filter driver 230 is per disk and transmits VM writes 280 to the detection engine 240. The VM writes are also four kilobytes in length or other length to match the length of fingerprinted binaries in the catalog 220. The detection engine 240 then computes the fingerprint for every incoming four kilobyte aligned block. If the computed fingerprint matches a fingerprint of any of the known malwares, the computed fingerprint for the write is a candidate for a match. The set of fingerprints matched for a malware along with their counts is kept track of. In an embodiment, the detection engine 240 can comprise a neural network trained using machine learning to recognize malware using a training set of known malware. The detection engine 240 could then detect malware without using the malware catalog and/or recognize malware not yet cataloged.

If no matching fingerprint for a candidate is found for the last k minutes as counted by the timer 250, the detection engine 240 discards the candidate. If more than p % of the fingerprints of a malware have matched over a predetermined time (e.g., 50% over 60 minutes), then the malware has potentially been detected. In an embodiment, the bloom filter 260 can match computed fingerprints against a bloom filter to reduce the number of fingerprints to check against known malware.

In addition to or alternatively, an embodiment can use offsets where the fingerprint occurs to increase the confidence of a match. That is, finding a malware's fingerprint subsequence in the fingerprints of the VM's writes.

Once malware is detected, the notifier 270 can power off affected VMs, send a notification to a user, and/or restore a VM to a point before the malware was detected. Accordingly, embodiments enable detection of malware in real-time during the download process to a VM before the malware is installed.

To ensure there is no impact to the primary VM during IO bursts, the fingerprint analysis can be done asynchronously while letting the input/output go through. In case a match is detected, there is a log of all the writes that were done, so they can be replayed to revert the VM to the state before the malware was downloaded.

In a multi-disk environment (e.g., RAID configurations), the detection engine 240 can combine fingerprints computed from multiple disks together to identify malware.

Figure 3:
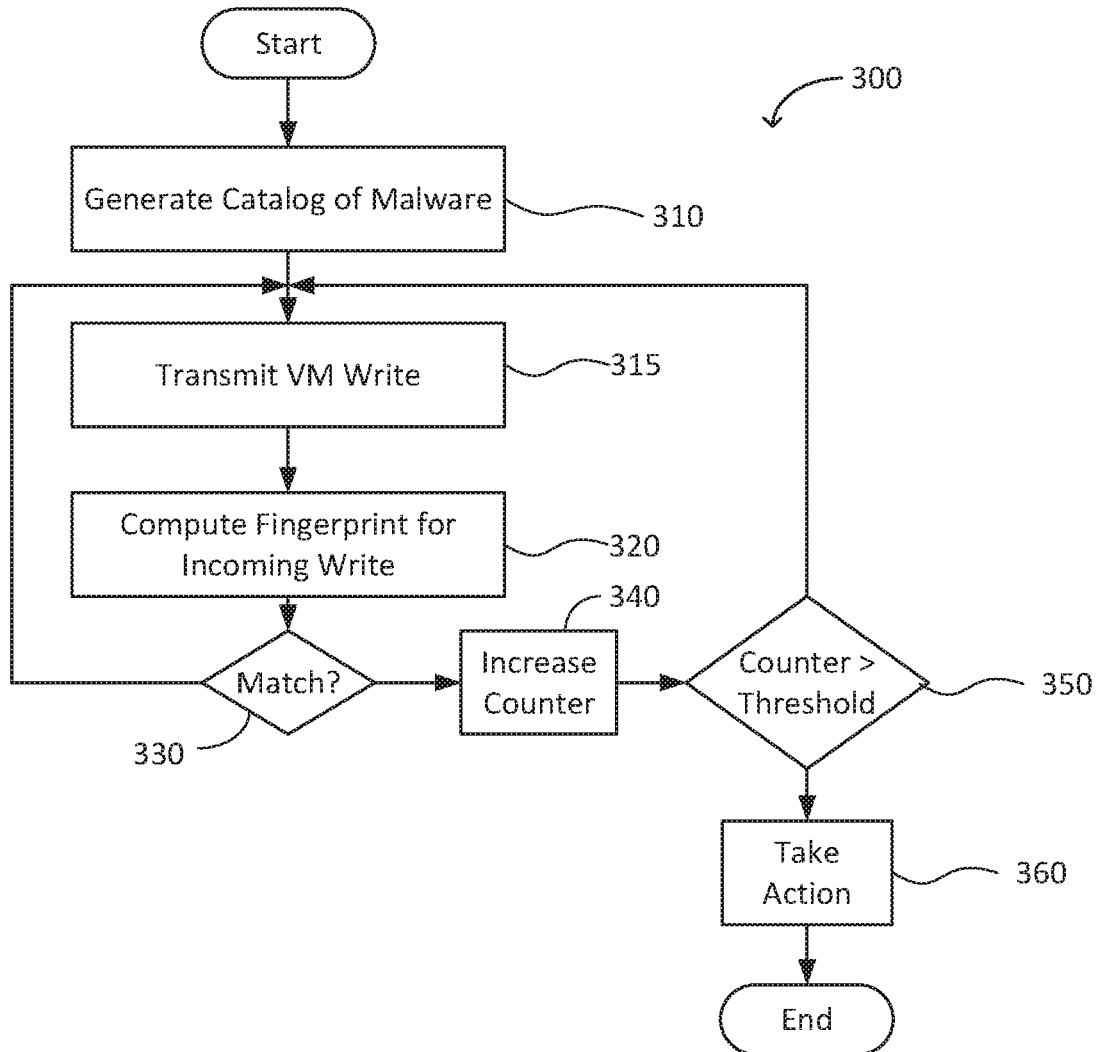
FIG. 3 shows an example method for protecting a virtual machine from malware.

FIG. 3 shows an example method 300 for protecting a virtual machine from malware. The method 300 may be performed by the server 160 and/or at the storage appliance 140 and/or storage appliance 170. For example, the filter driver 230 may transmit copies of virtual machine writes to a device not hosting the virtual machine. Alternatively, the method 300 can be performed on the same device hosting the virtual machine but outside of the virtual machine. Then, the method 300 can be performed separately from the virtual machine without disrupting virtual machine operation during input/output bursts.

Initially, the malware cataloger 210 generates (310) the malware catalog 220 as discussed above in conjunction with the FIG. 2. Then, the filter driver 230 transmits (315) a write received at the VM to outside of the VM to the detection engine 240. Next, the detection engine 240 computes (320) a fingerprint for each incoming write 280 to the VM. If (330) there is no match, then the detection engine 240 computes (320) a fingerprint for the next incoming transmitted (315) write 280 to the VM. In an embodiment, the detection engine 240 operates asynchronously with respect to the virtual machine. For example, the virtual machine can continue to receive input/output during the operation of method 300. If (330) there is a match, then the timer 250 increases (340) a counter. If (350) the counter is less than a threshold (e.g., less than 50% of incoming writes over a predetermined time), then the detection engine 240 returns to transmitting (315). Otherwise, if (350) the counter is greater than a threshold, the notifier 270 takes action (360), such as stopping (disabling or powering off) the VM, notifying a user via email, pop-up, text message, recorded voice call, etc., blocking source address of the malware, and/or reverting the VM to a pre-malware stage as discussed in conjunction with FIGS. 4 and 5 by reverting to a prior version of the VM using a snapshot. In addition, optionally, the bloom filter 260 can be used to expedite malware detection. Alternatively, or in addition, the detection engine 240 may comprise a neural network using machine learning to analyze the fingerprints to recognize malware without the need to access the catalog. In an embodiment, if a counter breaches a threshold then action (360) is taken.

Figure 4:
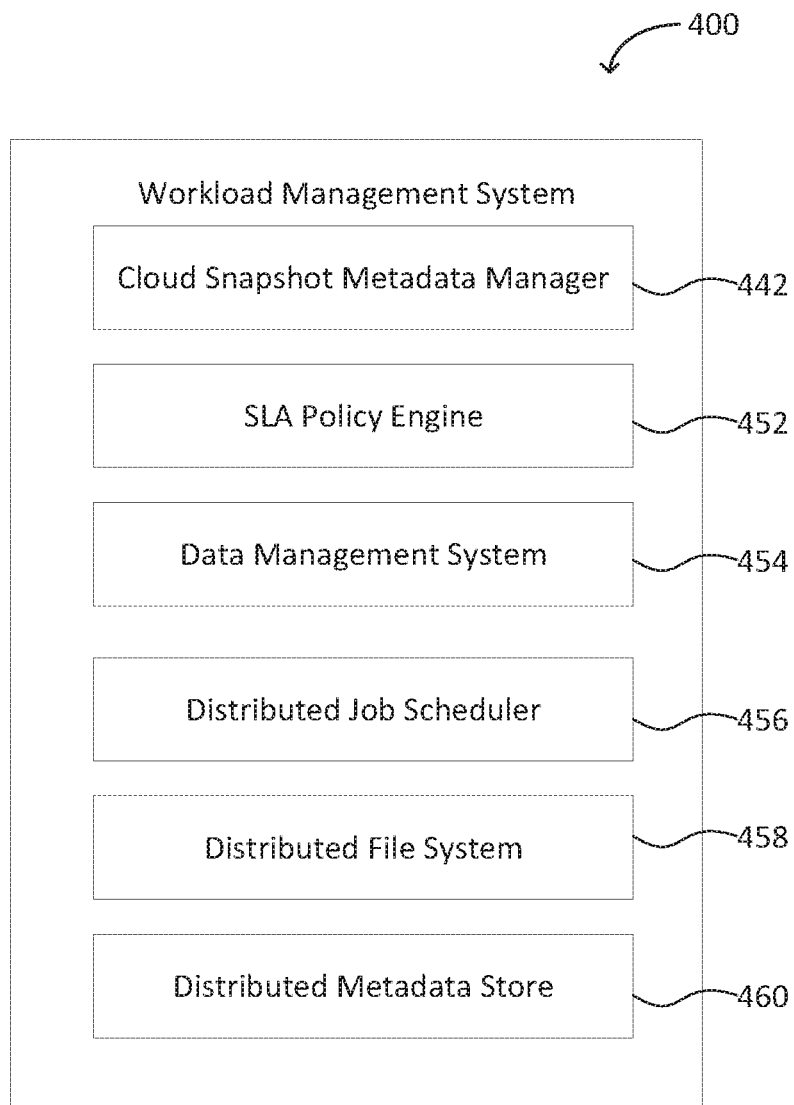
FIG. 4 shows an example workload management system.

FIG. 4 illustrates an example of a workload management system (WMS) 400. In one embodiment, the workload management system 400 may manage the extraction and storage of virtual machine snapshots captured at different time points of one or more virtual machines running in the virtualization manager 169 within the local datacenter 150. In one embodiment, the workload management system 400 may manage the snapshot capturing schedule of one or more virtual machines running on one or more cloud servers. In one embodiment, the workload management system 400 may manage the extraction and storage of virtual machine snapshots captured at different time points of one or more virtual machines running in the virtualization manager 169 within the local datacenter 150 and the snapshot capturing schedule of one or more virtual machines running on one or more cloud servers. In response to a restore or recover command from a WMS client, the workload management system 400 may restore a point-in-time version of a virtual machine or restore point-in-time versions of one or more files located on the virtual machine.

Referring to FIG. 4, the workload management system 400 may have several software-level components. The software-level components of the workload management system 400 may include a cloud snapshot metadata manager 442, an SLA policy engine 452, a data management system 454, a distributed job scheduler 456, a distributed metadata store 460, and a distributed file system 458. In one embodiment, the software-level components of the workload management system 400 may be run using a dedicated hardware-based appliance with one or more processors and memory system. In another embodiment, the software-level components of the workload management system 400 may be run from the cloud (e.g., the software-level components may be installed on a cloud server's platform).

The SLA policy engine 452 includes intelligence to determine the snapshot capturing schedule to meet terms of service level agreements between the workload management system 400 and the users, with specific aspects of the service, including how often to take virtual machine snapshots and how long to keep the snapshots, as agreed between the workload management system 400 and the users.

The distributed file system 458 may present itself as a single file system in the workload management system 400 and is shared by one or more physical machines connected to the workload management system 400. Each file stored in the distributed file system 458 may be partitioned into one or more chunks. Each of the one or more chunks may be stored within the distributed file system 458 as a separate file. The files stored within the distributed file system 458 may be replicated or mirrored over a plurality of physical machines, thereby creating a load-balanced and fault-tolerant distributed file system. In one example, workload management system 400 may include ten physical machines and a first file corresponding with a snapshot of a virtual machine (e.g.,/snapshots_A/s1/s1.full) may be replicated and stored on three of the ten machines.

The distributed metadata store 460 may include a distributed database management system that provides high availability without a single point of failure. In one embodiment, the distributed metadata store 460 may comprise a database, such as a distributed document-oriented database. The distributed metadata store 460 may be used as a distributed key-value storage system. In one example, the distributed metadata store 460 may comprise a distributed NoSQL key-value store database. In some cases, the distributed metadata store 460 may include a partitioned row store, in which rows are organized into tables or other collections of related data held within a structured format within the key-value store database. A table (or a set of tables) may be used to store metadata information associated with one or more files stored within the distributed file system 458. In one embodiment, a new file corresponding with a snapshot of a virtual machine may be stored within the distributed file system 458 and metadata associated with the new file may be stored within the distributed metadata store 460.

In some cases, the distributed metadata store 460 may be used to manage one or more versions of a virtual machine. Each version of the virtual machine may correspond with a full image snapshot of the virtual machine stored within the distributed file system 458 or an incremental snapshot of the virtual machine (e.g., a forward incremental or reverse incremental) stored within the distributed file system 458. In one embodiment, the one or more versions of the virtual machine may correspond to a plurality of files. The plurality of files may include a single full image snapshot of the virtual machine and one or more incrementals derived from the single full image snapshot. The single full image snapshot of the virtual machine may be stored using a first storage device of a first type (e.g., an HDD) and the one or more incrementals derived from the single full image snapshot may be stored using a second storage device of a second type (e.g., an SSD). In this case, only a single full image needs to be stored, and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals.

The distributed job scheduler 456 may be used for scheduling backup jobs that acquire and store virtual machine snapshots for one or more virtual machines in the local datacenters and the cloud servers over time. The distributed job scheduler 456 may follow a backup schedule to back up an entire image of a virtual machine at a particular point in time or one or more data volumes associated with the virtual machine at the particular point in time. In one example, the backup schedule is the SLA agreement that prevails between the workload management system 400 and the users. Each of the one or more tasks associated with a job may be run on a particular processor of the workload management system 400.

The distributed job scheduler 456 may comprise a distributed fault tolerant job scheduler, in which jobs affected by processor failures are recovered and rescheduled to be run on available processors. The distributed job scheduler 456 may run job scheduling processes on each processor in a workload management system 400 or on a plurality of processors in the workload management system 400. In one example, the distributed job scheduler 456 may run a first set of job scheduling processes on a first processor in the workload management system 400, a second set of job scheduling processes on a second processor in the workload management system 400, and a third set of job scheduling processes on a third processor in the workload management system 400. The first set of job scheduling processes, the second set of job scheduling processes, and the third set of job scheduling processes may store information regarding jobs, schedules, and the states of jobs using a metadata store, such as distributed metadata store 460. In the event that the first processor running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within 3 minutes from being started). In response to detecting jobs that have failed to be updated within the threshold period of time, the distributed job scheduler 456 may undo and restart the failed jobs on available processors within the workload management system 400.

The cloud snapshot metadata manager 442 may have the capability to finding content in snapshots captured from virtual machines running on multiple cloud servers, compile a metadata file for the contents in the snapshots and forward the metadata file to the WMS clients. The cloud snapshot metadata manager 442 may request data associated with virtual blocks stored on a data volumes of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be compiled to make a metadata file. However, if the snapshot of the virtual machine is not the first snapshot taken of the virtual machine, then only the data blocks of the virtual machine that have changed since a prior snapshot was taken may be compiled to make a metadata file.

The data management system 454 may comprise an application running on the workload management system 400 that manages and stores one or more snapshots of a virtual machine in the local datacenter 150. In one example, the data management system 454 may comprise a highest level layer in an integrated software stack running on the workload management system 400. The integrated software stack may include the data management system 454, the distributed job scheduler 456, the distributed metadata store 460, and the distributed file system 458. In some cases, the integrated software stack may run on other computing devices, such as a server or computing device. The local workload management system 400 may use the distributed job scheduler 456, the distributed metadata store 460, and the distributed file system 458 to manage and store one or more snapshots of a virtual machine in the local datacenter. Each snapshot of the virtual machine may correspond to a point-in-time version of the virtual machine. The local workload management system 400 may generate and manage a list of versions for the virtual machine. Each version of the virtual machine may map to or reference one or more chunks and/or one or more files stored within the distributed file system 458. Combined together, the one or more chunks and/or the one or more files stored within the distributed file system 458 may comprise a full image of the version of the virtual machine.

Figure 5:
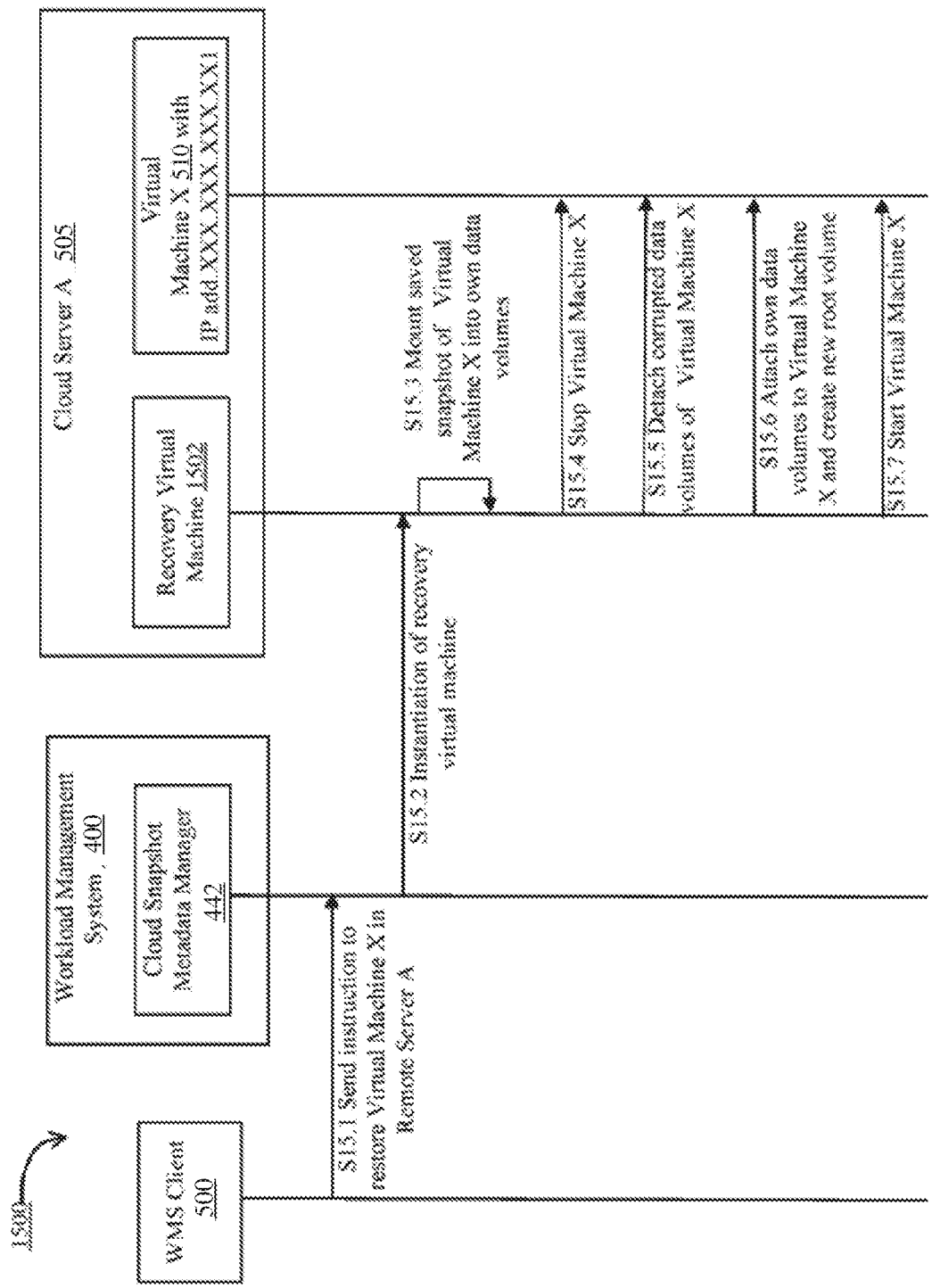
FIG. 5 shows an example flow diagram of restoring a virtual machine.

FIG. 5 is an example workflow 1500 illustrating a representative method of restoring a virtual machine on the cloud server A 505 by the workload management system 400. In some embodiments, the actions in the workflow may be performed in different orders and with different, fewer or additional actions than those illustrated in FIG. 5. Multiple actions can be combined in some implementations.

FIG. 5 includes workflow 1500 that begins at S15.1 when a client requests, through the virtual machine search index 106, to restore the virtual machine X on a cloud server A 505. The request is sent to the cloud snapshot metadata manager 442 in the workload management system 400.

Workflow 1500 continues at S15.2 when the cloud snapshot metadata manager 442 instantiates a recovery virtual machine 1502 on the cloud server A 505.

At S15.3, the recovery virtual machine 1502 mounts a snapshot of the virtual machine X into its own data volumes. In one embodiment, the mounted snapshot may be selected by the user. In another embodiment, the mounted snapshot may be the last saved snapshot. In one embodiment, the mounted snapshot may contain data for the corrupted data volumes. In another embodiment, the mounted snapshot may contain data for all the data volumes.

At S15.4, the recovery virtual machine 1502 shuts down the virtual machine X.

At S15.5, the recovery virtual machine 1502 detaches the damaged data volumes from the virtual machine X. In one embodiment, the recovery virtual machine 1502 may detach one or more corrupted data volumes, while keeping the uncorrupted volumes intact. In another embodiment, the recovery virtual machine 1502 may detach all the data volumes.

At S15.6, the recovery virtual machine 1502 detaches its own data volumes and attaches the detached data volumes to the virtual machine X. In one embodiment, the recovery virtual machine 1502 may also create a new root volume for the virtual machine X. In one embodiment, a root volume is created from an operating system image. In another embodiment, a root volume is created by mounting a snapshot containing an image of a previous version of a root volume of the virtual machine X. In one embodiment, data volumes which were mounted from snapshots are restored, while the rest of the data volumes of the virtual machine remain intact. In one embodiment, both the corrupted data volumes and the uncorrupted data volumes are restored.

At S15.7, the recovery virtual machine 1502 starts the virtual machine X with restored data volumes and root volume.

Figure 6:
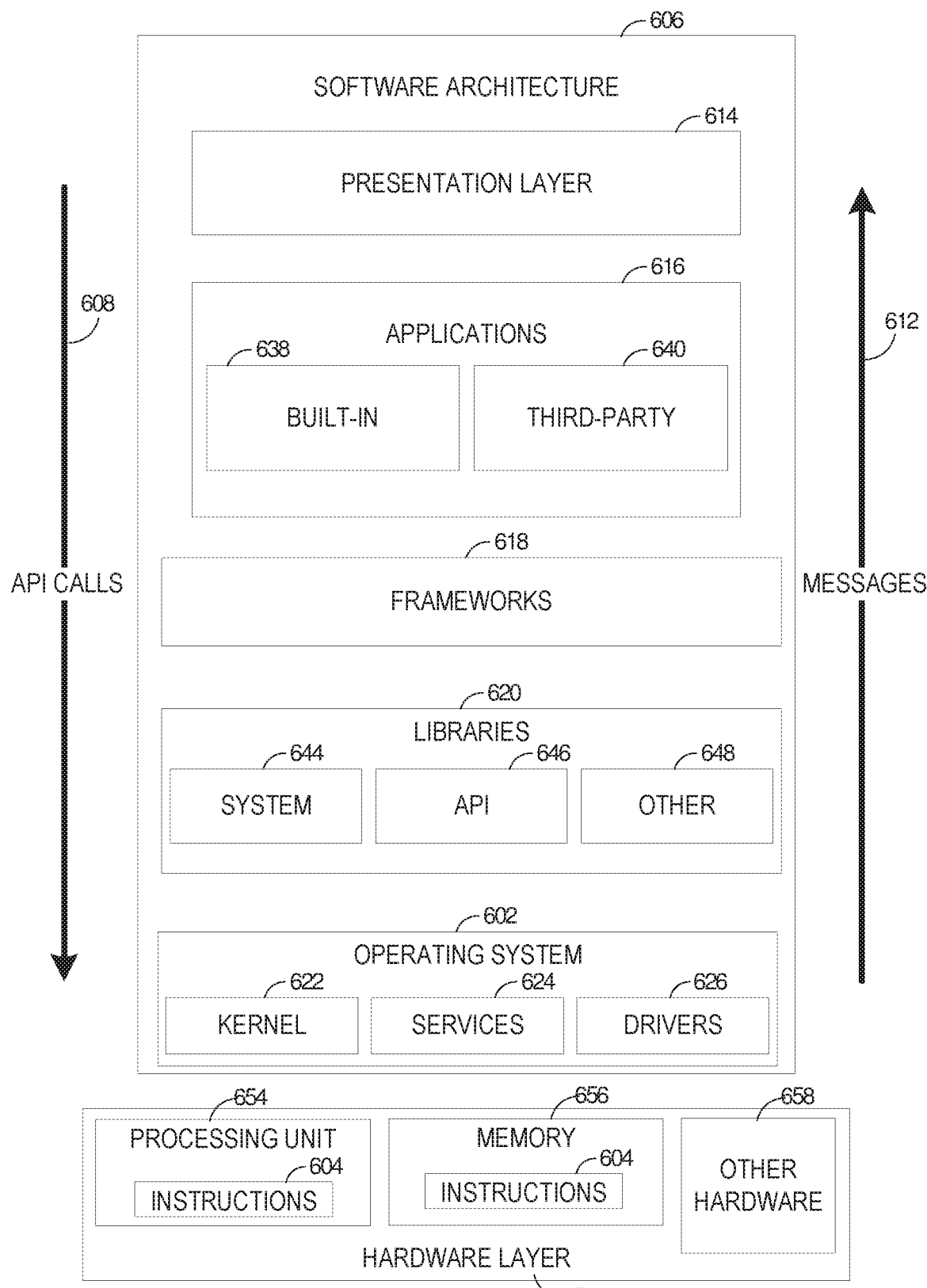
FIG. 6 is a block diagram illustrating a representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture, and it will be appreciated that many other architectures may be implemented to facilitate the functionality described herein. The software architecture 606 may execute on hardware such as a machine 700 of FIG. 7 that includes, among other things, processors, memory, and I/O components. A representative hardware layer 652 is illustrated and can represent, for example, the machine 700 of FIG. 7. The representative hardware layer 652 includes a processing unit 654 having associated executable instructions 604. The executable instructions 604 represent the executable instructions of the software architecture 606, including implementation of the methods, components, and so forth described herein. The hardware layer 652 also includes a memory/storage 656, which also has the executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke API calls 608 through the software stack and receive a response in the form of messages 612. The layers illustrated are representative in nature and not all software architectures have all layers. For example, some mobile or special-purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than by interfacing directly with the underlying operating system 602 functionality (e.g., kernel 622, services 624, and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 provide a higher-level common infrastructure that may be used by the applications 616 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. The third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as the operating system 602) to facilitate functionality described herein.

The applications 616 may use built-in operating system functions (e.g., kernel 622, services 624, and/or drivers 626), libraries 620, and frameworks/middleware 618 to create user interfaces to interact with users of the system. Alternatively, or additionally, in some systems, interactions with a user may occur through a presentation layer, such as the presentation layer 614. In these systems, the application/component "logic" can be separated from the aspects of the application/component that interact with a user.

Figure 7:
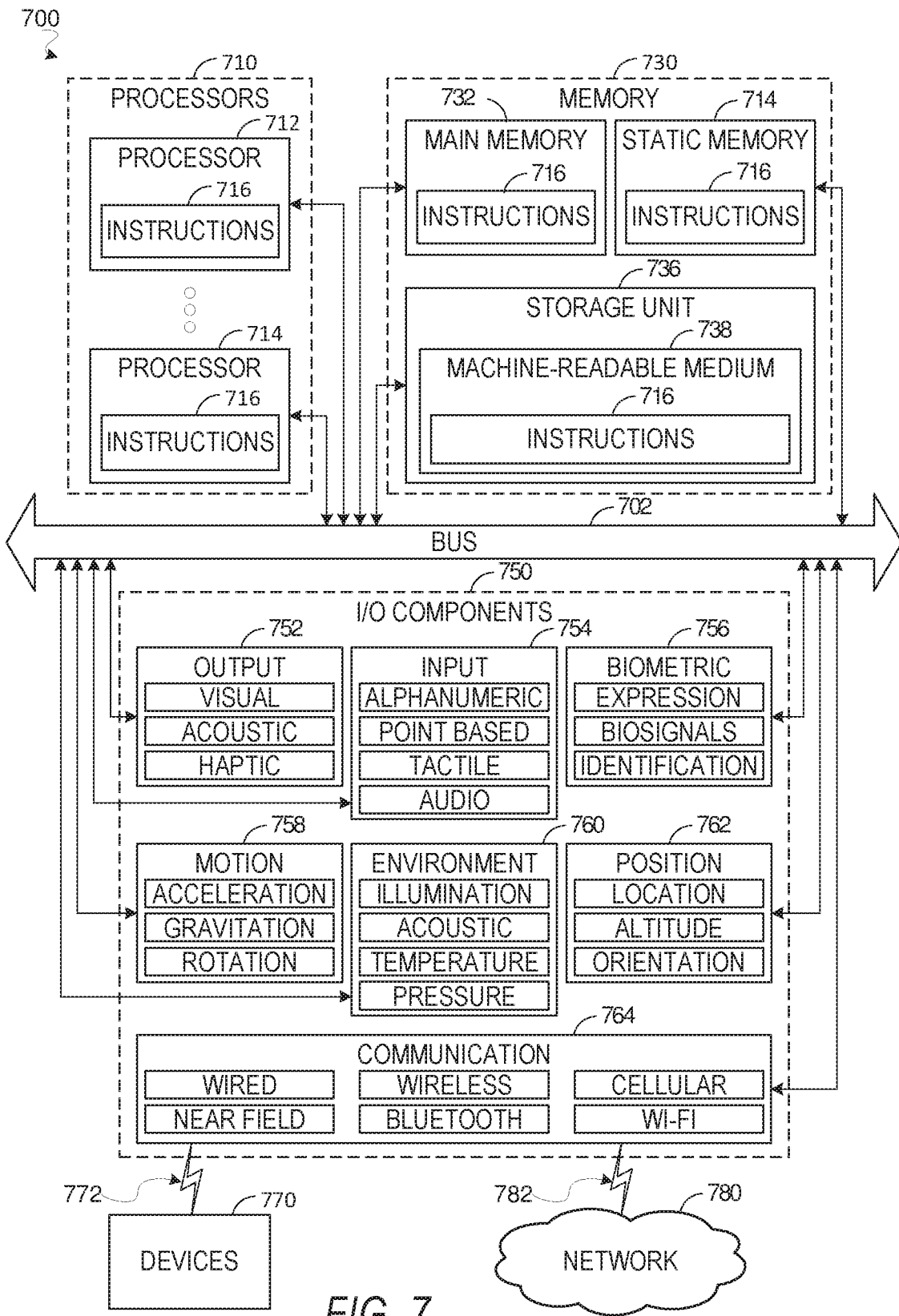
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. As such, the instructions 716 may be used to implement modules or components described herein. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines that individually or jointly execute the instructions 716 to perform any one or more of the methodologies discussed herein.

The machine 700 may include processors 710, memory/storage 730, and I/O components 750, which may be configured to communicate with each other such as via a bus 702. The memory/storage 730 may include a main memory 732, static memory 734, and a storage unit 736, both accessible to the processors 710 such as via the bus 702. The storage unit 736 and main memory 732 store the instructions 716 embodying any one or more of the methodologies or functions described herein. The instructions 716 may also reside, completely or partially, within the static memory 734, within the storage unit 736 (e.g., on machine readable-medium 738), within at least one of the processors 710 (e.g., within the processor cache memory accessible to processors 712 or 714), or any suitable combination thereof, during execution thereof by the machine 700. Accordingly, the main memory 732, static memory 734, the storage unit 736, and the memory of the processors 710 are examples of machine-readable media.

The I/O components 750 may include a wide variety of components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environment components 760, or position components 762 among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environment components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), or other components that may provide indications, measurements, or signals corresponding to a surrounding physical environment. The position components 762 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or other suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

"CARRIER SIGNAL" in this context refers to any intangible medium that is capable of storing, encoding, or carrying instructions 716 for execution by the machine 700, and includes digital or analog communications signals or other intangible media to facilitate communication of such instructions 716. Instructions 716 may be transmitted or received over the network 780 using a transmission medium via a network interface device and using any one of a number of well-known transfer protocols.

"CLIENT DEVICE" in this context refers to any machine 700 that interfaces to a network 780 to obtain resources from one or more server systems or other client devices. A client device may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 780.

"COMMUNICATIONS NETWORK" in this context refers to one or more portions of a network 780 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 780 may include a wireless or cellular network and the coupling 782 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, a device, or other tangible media able to store instructions 716 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 716. The term "machine-readable medium" shall also be taken to include any medium, or combination of multiple media, that is capable of storing instructions 716 (e.g., code) for execution by a machine 700, such that the instructions 716, when executed by one or more processors 710 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 712 or a group of processors 710) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 700) uniquely tailored to perform the configured functions and are no longer general-purpose processors 710.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 712 configured by software to become a special-purpose processor, the general-purpose processor 712 may be configured as respectively different special-purpose processors (e.g., comprising different hardware components) at different times. Software accordingly configures a particular processor 712 or processors 710, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 710 that are temporarily configured (e.g., by software) or permanently configured to perform the relevant operations. Whether temporarily or permanently configured, such processors 710 may constitute processor-implemented components that operate to perform one or more operations or functions described herein. As used herein, "processor-implemented component" refers to a hardware component implemented using one or more processors 710. Similarly, the methods described herein may be at least partially processor-implemented, with a particular processor 712 or processors 710 being an example of hardware. For example, at least some of the operations of a method may be performed by one or more processors 710 or processor-implemented components. Moreover, the one or more processors 710 may also operate to support performance of the relevant operations in a "cloud computing" environment or as a "software as a service" (SaaS). For example, at least some of the operations may be performed by a group of computers (as examples of machines 700 including processors 710), with these operations being accessible via a network 780 (e.g., the Internet) and via one or more appropriate interfaces (e.g., an API). The performance of certain of the operations may be distributed among the processors 710, not only residing within a single machine 700, but deployed across a number of machines 700. In some example embodiments, the processors 710 or processor-implemented components may be located in a single geographic location (e.g., within a home environment, an office environment, or a server farm). In other example embodiments, the processors 710 or processor-implemented components may be distributed across a number of geographic locations.

"PROCESSOR" in this context refers to any circuit or virtual circuit (a physical circuit emulated by logic executing on an actual processor 712) that manipulates data values according to control signals (e.g., "commands," "op codes," "machine code," etc.) and which produces corresponding output signals that are applied to operate a machine 700. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 710 may further be a multi-core processor 710 having two or more independent processors 712, 714 (sometimes referred to as "cores") that may execute instructions 716 contemporaneously.

"TIMESTAMP" in this context refers to a sequence of characters or encoded information identifying when a certain event occurred, for example giving date and time of day, sometimes accurate to a small fraction of a second.

The following examples describe various embodiments of methods, machine-readable media, and systems (e.g., machines, devices, or other apparatus) discussed herein.

EXAMPLES

1. A data management system, comprising:
a storage appliance configured to store a snapshot of a virtual machine;
one or more processors in communication with the storage appliance, the one or more processors configured to perform operations including:
receiving, at the storage appliance from a server hosting the virtual machine, a write made to the virtual machine;
computing, at the storage appliance, a fingerprint of the transmitted write;
comparing, at the storage appliance, the computed fingerprint to malware fingerprints in a malware catalog;
repeating the computing and comparing; and
disabling the virtual machine if a number of matches from the comparing breaches a predetermined threshold over a predetermined amount of time.

2. The system of example 1, wherein the operations further include restoring the virtual machine using the snapshot stored in the storage appliance to a state before the predetermined threshold was breached.

3. The system of example 1, wherein the operations further include blocking writes from a source of the matches.

4. The system of example 1, wherein the operations further include generating the malware catalog including generating fingerprints of binaries and compressed binaries of known malware.

5. The system of example 4, wherein the fingerprints are computed at 4 kilobytes aligned offsets generated using SHA256.

6. The system of example 1, wherein the operations further include repeatedly generating snapshots of the virtual machine over time.

7. A computer-implemented method at a data management system, the method comprising:
receiving, at a storage appliance from a server hosting a virtual machine, a write made to the virtual machine;
computing, at the storage appliance, a fingerprint of the transmitted write;
comparing, at the storage appliance, the computed fingerprint to malware fingerprints in a malware catalog;
repeating the computing and comparing; and
disabling the virtual machine if a number of matches from the comparing breaches a predetermined threshold over a predetermined amount of time.

8. The method of example 7, further comprising restoring the virtual machine using a snapshot stored in the storage appliance to a state before the predetermined threshold was breached.

9. The method of example 7, further comprising blocking writes from a source of the matches.

10. The method of example 7, further comprising generating the malware catalog including generating fingerprints of binaries and compressed binaries of known malware.

11. The method of example 10, wherein the fingerprints are computed at 4 kilobytes aligned offsets generated using SHA256.

12. The method of example 7, further comprising repeatedly generating snapshots of the virtual machine over time.

13. A non-transitory, machine-readable medium storing instructions which, when read by a storage appliance, cause the storage appliance to perform operations comprising, at least:
receiving, at the storage appliance from a server hosting a virtual machine, a write made to the virtual machine;
computing, at the storage appliance, a fingerprint of the transmitted write;
comparing, at the storage appliance, the computed fingerprint to malware fingerprints in a malware catalog;
repeating the computing and comparing; and disabling the virtual machine if a number of matches from the comparing breaches a predetermined threshold over a predetermined amount of time.

14. The machine-readable medium of example 13, wherein the operations further include restoring the virtual machine using a snapshot stored in the storage appliance to a state before the predetermined threshold was breached.

15. The machine-readable medium of example 13, wherein the operations further include blocking writes from a source of malware.

16. The machine-readable medium of example 13, wherein the operations further include generating the malware catalog including generating fingerprints of binaries and compressed binaries of known malware.

17. The machine-readable medium of example 16, wherein the fingerprints are computed at 4 kilobytes aligned offsets generated using SHA256.

18. The machine-readable medium of example 13, wherein the operations further include repeatedly generating snapshots of the virtual machine over time.

The invention claimed is:

1. A data management system, comprising:
a storage appliance configured to store a snapshot of a virtual machine; and
one or more processors in communication with the storage appliance, the one or more processors configured to perform operations including:
receiving, at the storage appliance from a server hosting the virtual machine, a write made to the virtual machine;
computing, at the storage appliance, a fingerprint of the received write;
comparing, at the storage appliance, the computed fingerprint to malware fingerprints in a malware catalog while the virtual machine continues to receive writes;
repeating the computing and comparing for the continued received writes; and
disabling the virtual machine if a number of matches from the comparing breaches a predetermined threshold over a predetermined amount of time, the predetermined threshold greater than one.

2. The system of claim 1, wherein the operations further include restoring the virtual machine using the snapshot stored in the storage appliance to a state before the predetermined threshold was breached.

3. The system of claim 1, wherein the operations further include blocking writes from a source of the matches.

4. The system of claim 1, wherein the operations further include generating the malware catalog including generating fingerprints of binaries and compressed binaries of known malware.

5. The system of claim 4, wherein the fingerprints are computed at 4 kilobytes aligned offsets generated using SHA256.

6. The system of claim 1, wherein the operations further include repeatedly generating snapshots of the virtual machine over time.

7. A computer-implemented method at a data management system, the method comprising:
receiving, at a storage appliance from a server hosting a virtual machine, a write made to the virtual machine;
computing, at the storage appliance, a fingerprint of the received write;
comparing, at the storage appliance, the computed fingerprint to malware fingerprints in a malware catalog while the virtual machine continues to receive writes;
repeating the computing and comparing for the continued received writes;
maintaining a log of the continued received writes; and
reversing the writes to revert the virtual machine per the maintained log if a number of matches from the comparing breaches a predetermined threshold over a predetermined amount of time.

8. The method of claim 7, further comprising restoring the virtual machine using a snapshot stored in the storage appliance to a state before the predetermined threshold was breached.

9. The method of claim 7, further comprising blocking writes from a source of the matches.

10. The method of claim 7, further comprising generating the malware catalog including generating fingerprints of binaries and compressed binaries of known malware.

11. The method of claim 10, wherein the fingerprints are computed at 4 kilobytes aligned offsets generated using SHA256.

12. The method of claim 7, further comprising repeatedly generating snapshots of the virtual machine over time.

13. A non-transitory, machine-readable medium storing instructions which, when read by a storage appliance, cause the storage appliance to perform operations comprising, at least:
receiving, at the storage appliance from a server hosting a virtual machine, a write made to the virtual machine;
computing, at the storage appliance, a fingerprint of the received write;
comparing, at the storage appliance, the computed fingerprint to malware fingerprints in a malware catalog while the virtual machine continues to receive writes;
repeating the computing and comparing for the continued received writes; and
disabling the virtual machine if a number of matches from the comparing breaches a predetermined threshold over a predetermined amount of time, the predetermined threshold greater than one.

14. The machine-readable medium of claim 13, wherein the operations further include restoring the virtual machine using a snapshot stored in the storage appliance to a state before the predetermined threshold was breached.

15. The machine-readable medium of claim 13, wherein the operations further include blocking writes from a source of the matches.

16. The machine-readable medium of claim 13, wherein the operations further include generating the malware catalog including generating fingerprints of binaries and compressed binaries of known malware.

17. The machine-readable medium of claim 16, wherein the fingerprints are computed 4 kilobytes aligned offsets generated using SHA256.

18. The machine-readable medium of claim 13, wherein the operations further include repeatedly generating snapshots of the virtual machine over time.

* * * * *